US010415399B2

(12) United States Patent
Ducharme et al.

(10) Patent No.: US 10,415,399 B2
(45) Date of Patent: Sep. 17, 2019

(54) COMPOSITE STATOR WITH INTEGRAL PLATFORMS FOR GAS TURBINE ENGINES

(71) Applicant: United Technologies Corporation, Farmington, CT (US)

(72) Inventors: Michael G. Ducharme, Rocky Hill, CT (US); Farruqh Shahab, Rockville, CT (US)

(73) Assignee: United Technologies Corporation, Farmington, CT (US)

( * ) Notice: Subject to any disclaimer, the term of this patent is extended or adjusted under 35 U.S.C. 154(b) by 149 days.

(21) Appl. No.: 15/691,498

(22) Filed: Aug. 30, 2017

(65) Prior Publication Data

US 2019/0063233 A1 Feb. 28, 2019

(51) Int. Cl.
F01D 5/14 (2006.01)
F01D 9/04 (2006.01)
F01D 5/28 (2006.01)
F01D 5/22 (2006.01)
B29D 99/00 (2010.01)
C04B 35/80 (2006.01)
F01D 11/00 (2006.01)
B29L 31/08 (2006.01)

(52) U.S. Cl.
CPC .......... F01D 5/282 (2013.01); B29D 99/0025 (2013.01); C04B 35/80 (2013.01); F01D 5/147 (2013.01); F01D 5/225 (2013.01); F01D 9/041 (2013.01); F01D 11/008 (2013.01); B29L 2031/08 (2013.01); C04B 2235/5248 (2013.01); C04B 2235/5252 (2013.01); C04B 2235/94 (2013.01); F05D 2240/12 (2013.01); F05D 2300/224 (2013.01); F05D 2300/603 (2013.01); F05D 2300/6034 (2013.01)

(58) Field of Classification Search
CPC .......... F01D 5/147; F01D 5/225; F01D 5/282; F01D 9/041; F01D 11/008; F05D 2240/12; F05D 2300/6034
See application file for complete search history.

(56) References Cited

U.S. PATENT DOCUMENTS

| 5,569,019 | A | 10/1996 | Katariya et al. |
| 8,734,925 | B2 | 5/2014 | Kweder et al. |
| 9,303,520 | B2 | 4/2016 | Hasting et al. |

(Continued)

FOREIGN PATENT DOCUMENTS

| EP | 2233697 | 9/2010 |
| EP | 2562390 | 2/2013 |

(Continued)

OTHER PUBLICATIONS

European Search Report for Application No. 18191814.5 dated Dec. 17, 2018.

Primary Examiner — Erick R Solis
(74) Attorney, Agent, or Firm — Carlson, Gaskey & Olds, P.C.

(57) ABSTRACT

A composite fiber stator ring for a gas turbine engine compressor includes a plurality of composite fiber vane structures. Each of the composite fiber vane structures includes a plurality of fiber plies. All of the fiber plies flow in a single direction at each joint of the corresponding composite fiber vane structure. The plurality of composite fiber vane structures are arranged circumferentially in a ring.

20 Claims, 3 Drawing Sheets

(56) References Cited

U.S. PATENT DOCUMENTS

| | | | |
|---|---|---|---|
| 2006/0127217 A1* | 6/2006 | McMillan | F01D 5/147 |
| | | | 415/200 |
| 2007/0177973 A1 | 8/2007 | Seki et al. | |
| 2011/0243742 A1 | 10/2011 | Dezouche et al. | |
| 2012/0051920 A1* | 3/2012 | McCaffrey | F01D 5/282 |
| | | | 416/219 R |
| 2013/0052030 A1* | 2/2013 | McCaffrey | B29C 70/00 |
| | | | 416/241 B |
| 2014/0064956 A1 | 3/2014 | Drane | |
| 2017/0009593 A1 | 1/2017 | Watanabe | |
| 2017/0009600 A1* | 1/2017 | Grasso | F01D 5/189 |
| 2018/0171805 A1* | 6/2018 | Freeman | F01D 5/282 |
| 2018/0230823 A1* | 8/2018 | Sippel | F01D 5/282 |
| 2018/0363474 A1* | 12/2018 | Kittleson | F01D 5/284 |

FOREIGN PATENT DOCUMENTS

| | | |
|---|---|---|
| EP | 2570593 | 3/2013 |
| EP | 2800877 | 11/2014 |
| EP | 3124750 | 2/2017 |

* cited by examiner

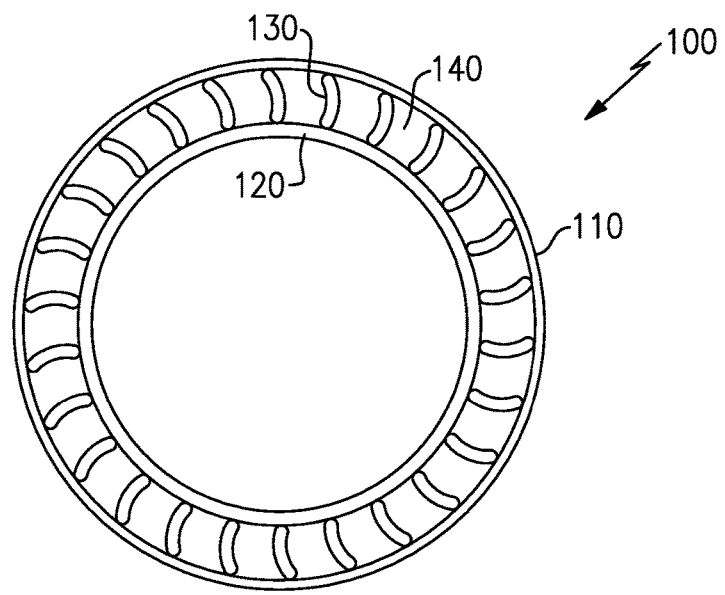
FIG.2
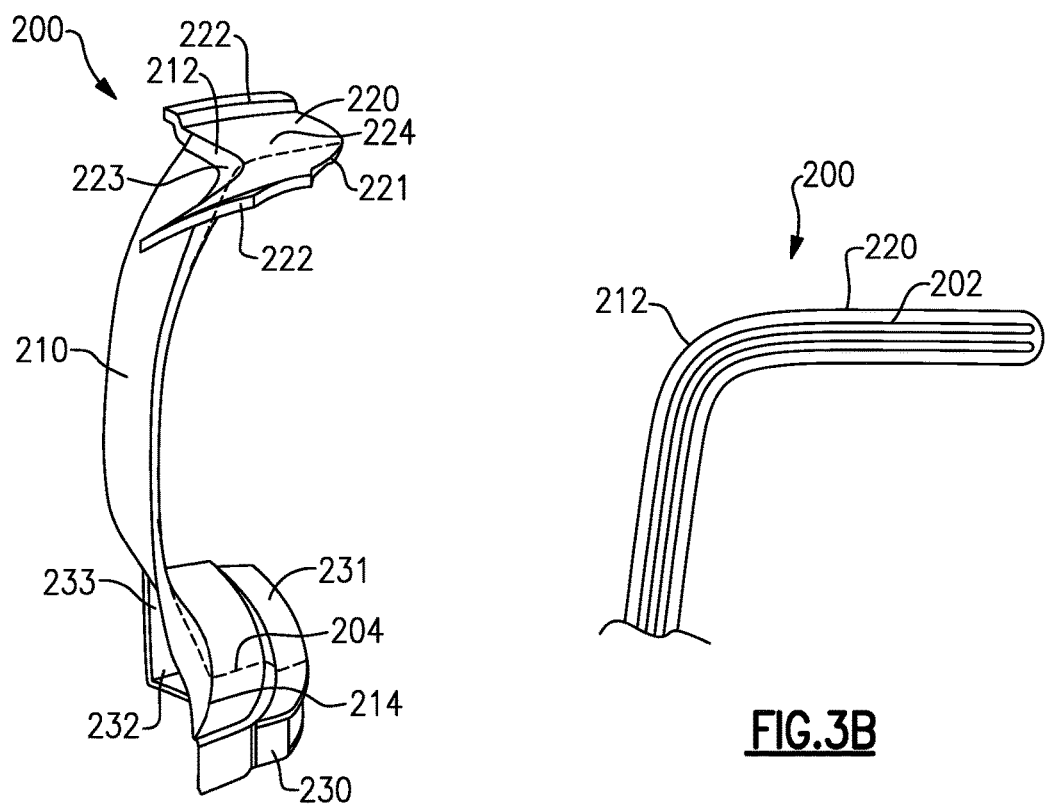
FIG.3A
FIG.3B

COMPOSITE STATOR WITH INTEGRAL PLATFORMS FOR GAS TURBINE ENGINES

STATEMENT REGARDING FEDERALLY SPONSORED RESEARCH OR DEVELOPMENT

This invention was made with government support under contract number FA8626-16-C-2139 awarded by the United States Air Force. The government has certain rights in the invention.

TECHNICAL FIELD

The present disclosure relates generally to compressor vanes for utilization in gas turbine engines, and more specifically to a composite stator vane configuration for utilization in a gas turbine engine compressor section.

BACKGROUND

Gas turbine engines generally operate by ingesting air at a compressor inlet and compressing the air in the compressor. The compressed air is provided to a combustor, where the compressed air is mixed with a fuel and ignited. The resultant combustion products are expanded across a turbine section, and drive rotation of the turbine section. The turbine section is connected to the compressor section via one or more shafts, and rotation of the turbine drives rotation of the compressor. In some examples, the shaft is further connected to a fan either directly or through a geared fan drive, and drives rotation of the fan.

Included within each of the compressor and the turbine sections are multiple stages. Each stage includes a ring of rotors and a paired ring of stators, with the rotors and stators being aerodynamically configured to drive fluid through the compressor stage, and be driven to rotate as fluid passes through the turbine stage. The stator vanes, and the rotor blades, typically include airfoil shaped profiles and span the primary flowpath of the gas turbine engine.

SUMMARY OF THE INVENTION

In one exemplary embodiment a gas turbine engine includes a compressor section having a plurality of stages, a combustor section fluidly connected to the compressor section via a primary flowpath, a turbine section fluidly connected to the combustor section via the primary flowpath, and at least one of the stages including a plurality of composite fiber vane structures, each of the composite fiber vane structures comprising a plurality of fiber plies, all of the fiber plies flowing in a single direction at each joint of the corresponding composite fiber vane structure.

In another example of the above described gas turbine engine each of the composite fiber vane structures comprises an outer diameter platform including a fastenerless connection feature.

In another example of any of the above described gas turbine engines each of the composite fiber vane structures includes a stator vane connecting an inner diameter platform to an outer diameter platform.

In another example of any of the above described gas turbine engines each of the composite fiber vane structures further includes a second vane connecting the inner diameter platform to the outer diameter platform.

In another example of any of the above described gas turbine engines the at least one of the at least one stages further includes a plurality of outer spacer platforms and an outer diameter of the at least one of the at least one stages is configured as an alternating set of the outer diameter platforms and the outer spacer platforms.

In another example of any of the above described gas turbine engines the at least one of the at least one stages further includes a plurality of inner diameter spacer platforms and an inner diameter of the at least one of the at least one stages is configured as an alternating set of the inner diameter platforms and the inner diameter spacer platforms.

In another example of any of the above described gas turbine engines each of the inner diameter platforms includes a seal carrying feature.

In another example of any of the above described gas turbine engines the plurality of fiber plies consists of structural fiber plies.

In another example of any of the above described gas turbine engines the fiber plies comprise carbon fiber plies.

In another example of any of the above described gas turbine engines each of the plurality of stages is comprised of the plurality of composite fiber vane structures.

In one exemplary embodiment a composite fiber stator ring for a gas turbine engine compressor, includes a plurality of composite fiber vane structures, each of the composite fiber vane structures comprising a plurality of fiber plies, all of the fiber plies flowing in a single direction at each joint of the corresponding composite fiber vane structure, and the plurality of composite fiber vane structures arranged circumferentially in a ring.

In another example of the above described composite fiber stator ring for a gas turbine engine compressor the plurality of fiber plies consist of structural fiber plies.

Another example of any of the above described composite fiber stator rings for a gas turbine engine compressor further includes a plurality of outer diameter spacer platforms and a plurality of inner diameter spacer platforms, and wherein each of the composite fiber vane structures is circumferentially adjacent to two outer diameter spacer platforms and two inner diameter spacer platforms.

In another example of any of the above described composite fiber stator rings for a gas turbine engine compressor the composite fiber vane structure is a composite fiber vane doublet.

In another example of any of the above described composite fiber stator rings for a gas turbine engine compressor the composite fiber vane structure is a singlet.

In another example of any of the above described composite fiber stator rings for a gas turbine engine compressor the fiber plies comprise carbon fiber plies.

In another example of any of the above described composite fiber stator rings for a gas turbine engine compressor each composite fiber vane structure is retained in the composite fiber stator ring via a fastenerless connection feature.

In another example of any of the above described composite fiber stator rings for a gas turbine engine compressor the fastenerless connection feature is a component of an outer diameter platform of each of the composite fiber vane structures.

In another example of any of the above described composite fiber stator rings for a gas turbine engine compressor an inner diameter of the composite fiber vane structure is configured to carry an inner diameter seal.

An exemplary method for constructing a composite stator vane structure for a gas turbine engine compressor includes flowing a plurality of carbon fiber plies in a single direction at each joint between at least one vane and corresponding inner and outer diameter platforms such that each fiber plie in the plurality of fiber plies is a structural fiber plie.

These and other features of the present invention can be best understood from the following specification and drawings, the following of which is a brief description.

BRIEF DESCRIPTION OF THE DRAWINGS

FIG. 2 schematically illustrates an exemplary stator vane ring for one compressor stage of the gas turbine engine of FIG. 1.

FIG. 3A schematically illustrates an isometric view of a stator vane singlet configuration for utilization in the stator vane ring of FIG. 2.

FIG. 3B schematically illustrates exemplary carbon fiber plies at a single joint between a vane and a platform.

DETAILED DESCRIPTION OF AN EMBODIMENT

Figure 1:
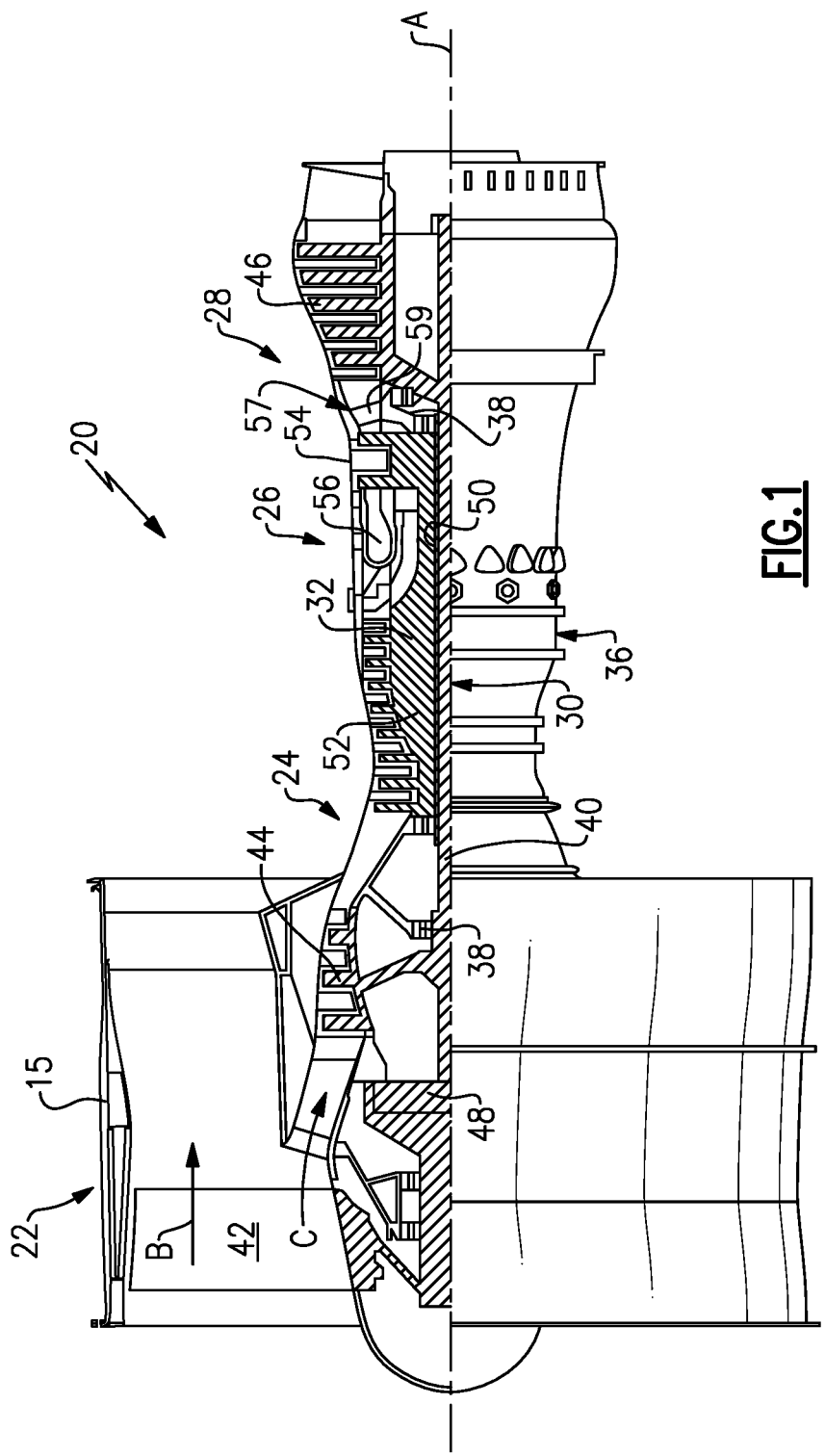
FIG. 1 schematically illustrates an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

With continued reference to FIG. 1, FIG. 2 schematically illustrates a stator ring 100 for utilization in one stage of the compressor section 24 of the gas turbine engine 20 of FIG. 1. The stator ring 100 includes an outer diameter 110 and an inner diameter 120 defining a flowpath 140. Multiple stator vanes 130 connect the inner diameter 120 to the outer diameter 110 and span the flowpath 140. Each of the outer diameter 110 and the inner diameter 120 are made up, at least partially, of multiple platforms with each platform being integrally formed with one or more of the stator vanes 130. In some examples, the stator vanes 130 and platforms can be constructed of a carbon fiber composite material. Alternatively, any other fiber composite material could be utilized to the same effect.

The integral stator vanes 130 and platforms are constructed via the usage of fiber pre-preg plies that are wrapped to form the desired structure according to known fiber composite manufacturing techniques. In existing systems, where one or both of the integral platforms extend circumferentially from both circumferential edges of the stator vane, or vanes, the plies are required to bend in both circumferential directions at the joint between the vane and the platform. As a result, triangular or similarly shaped voids are formed in the fiber plie structure. In order to provide structural integrity, the voids are filled using filler (non-structural) plies at the location where the vane is blended into the platform. The presence of the filler plies causes an amount of flex to occur in the structural outer plies at the joint. This flex can, in some instances, result in a rippling or crinkling effect on the outer plies which can negatively effect the overall structural integrity of the vane singlet or doublet.

In order to eliminate the downsides associated with the flex, the composite stator vanes 130 of FIG. 2, and those disclosed herein with regards to FIGS. 3A-4B, flow the fiber plies in a single direction at each joint between the vane 130 and the corresponding inner diameter 110 and outer diameter 120 platforms. As a result of the single flow direction at each joint, the triangular or similar shaped voids are not present, and filler plies are not required.

With continued reference to FIGS. 1 and 2, FIGS. 3A and 3B schematically illustrates a carbon fiber composite vane singlet 200 including a vane 210 that is integrally formed with an outer diameter platform 220 and an inner diameter platform 230. FIG. 3A illustrates a schematic isometric view of the entire structure, while FIG. 3B illustrates an exemplary cross section of the outer diameter platform 220 including a number of carbon fiber plies 202, with the scale exaggerated for effect. In a practical example, the actual number of fiber plies 202 will be substantially higher than the illustrated number of carbon fiber plies 202.

A dashed line in the carbon fiber composite vane singlet 200 of FIG. 3A indicates a flow direction of one exemplary carbon fiber plie 204 utilized to create the singlet 200. At each joint 212, 214 between the vane 210 and the corresponding platforms 220, 230, the carbon fiber plie 204 only bends in a single direction. As a result of the single direction bend, there is no need to incorporate non-structural filler plies and the crinkling or rippling effect is eliminated.

As an additional feature, the outer diameter platform 220 includes raised lip portions 222 on each axial end of the composite vane singlet 200, relative to an axis defined by a fully assembled vane ring. The raised lip portions 222 extend radially higher than a main outer diameter platform body 224, and are configured to interface with a fastenerless connection system. The fastenerless connection system interconnects the outer platform 220 with circumferentially adjacent outer platforms 220 via a connector that the raised portions 222 fit into. The interconnection allows the singlets 200 to form a compressor vane ring, such as the compressor stator ring 100 of FIG. 2.

In some examples, the outer platforms 220 include nesting circumferential ends 221, 223, with the nesting circumferential ends 221, 223 being contoured to nest with a corresponding opposite circumferential end 221, 223 of each adjacent singlet 200. In alternative examples, the nesting circumferential ends 221, 223 can nest with spacer elements in an alternating fashion.

The inner diameter platform 230 includes a seal box 232 configured to carry a seal according to any known inner diameter seal configuration. As with the outer diameter platform 220, the inner diameter platform 230 includes nesting ends 231, 233, with a first nesting end 231 have a smaller profile and being configured to be received in the second nesting end 233 of an adjacent inner platform 230.

Figure 4A:
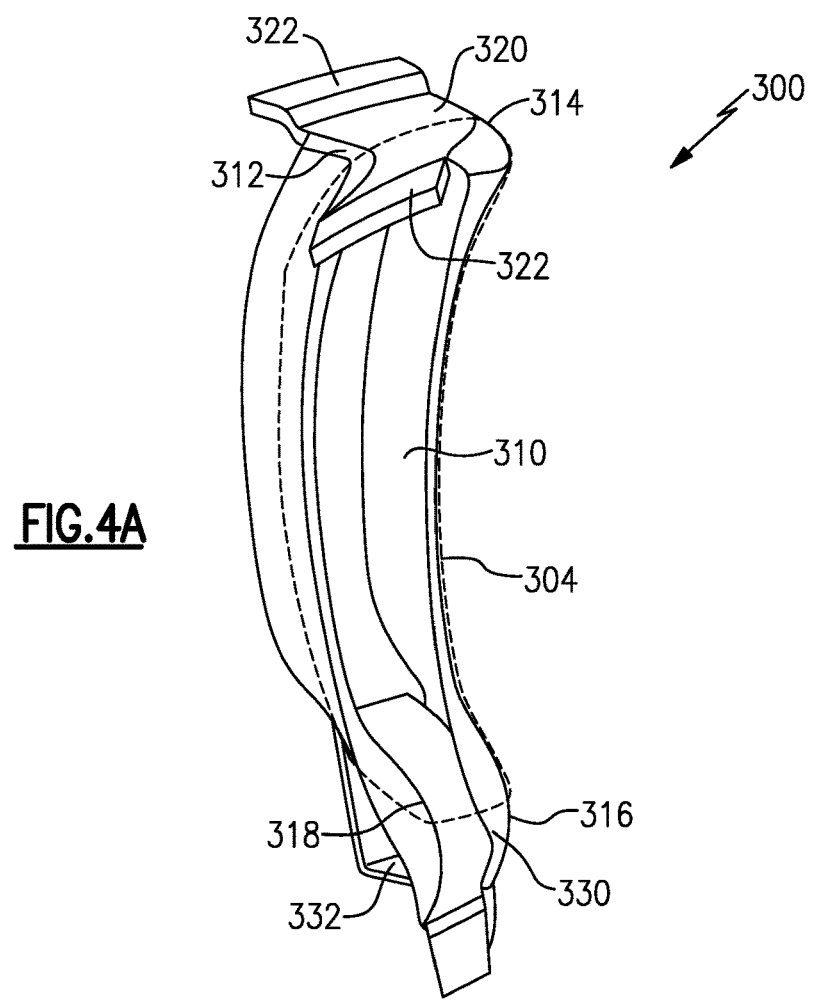
FIG. 4A schematically illustrates an isometric view of a composite fiber vane doublet.
Figure 4B:
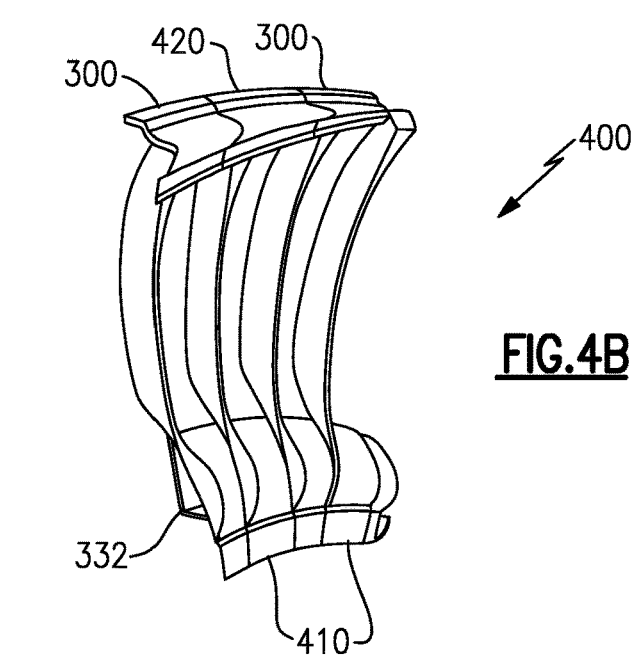
FIG. 4B schematically illustrates a selection of vane doublets of FIG. 4A alternated with corresponding inner and outer diameter spacers to form a portion of a compressor stator vane ring.

With continued reference to FIGS. 1-3B, FIGS. 4A and 4B illustrate a similar carbon fiber composite vane doublet 300 (FIG. 4A) and the incorporation of the carbon fiber vane doublet 300 in a partial stator vane ring 400 (FIG. 4B). As with the singlet 200 of FIG. 3A, the carbon fiber composite vane doublet 300 includes an outer platform 320 connected to an inner platform 330 by a first and second vane 310. The vanes 310 and the platforms 320, 330 are constructed of a carbon fiber plies 304 that are looped to form the general structure of the composite fiber vane doublet 300. One exemplary carbon fiber plie 304 is illustrated via a dashed line. The carbon fiber plies 304 bend in only a single direction at each joint 312, 314, 316, 318 between the vanes 310 and the inner and outer platforms 320, 330 resulting in the same benefits described with regards to the singlet 200 of FIG. 3A.

The outer diameter platform 320 is positioned at a radially outward end of each vane 310, and includes radially raised portions 322 along the axial edges of the outer platform 320. As with the radially raised lip portions 222 of FIG. 3A, the radially raised edges 322 interface with a fastenerless connection system, and allow the vane doublet 300 to be interconnected with adjacent spacers 420 (see FIG. 4B) to form a full stator vane ring of the corresponding compressor stage. The outer diameter platform further includes first and second circumferential edges at the corresponding joints 312, 314. Each of the circumferential edges is configured to nest with an adjacent component.

Due to the single bend direction of the carbon fiber plies 304, the inner diameter and outer diameter platforms 320, 330 do not extend circumferentially beyond the joints 312, 314, 316, 318. Instead, an inner diameter spacer 410 is positioned adjacent to, and nested with, each inner diameter platform 330 in an assembled vane ring 400. Similarly, an outer diameter spacer 420 is positioned adjacent to, and nested with, each outer diameter platform 320 in the assembled vane ring 400. As a result, the inner diameter ring and the outer diameter ring each alternate between a corresponding spacer 410, 420 and a corresponding platform 320, 330.

In the illustrated example of FIG. 4B, the spacers 401, 420 are substantially identical in their nesting configuration to the corresponding platforms. In alternate configurations, however, the platforms 320, 330 and the spacers 410, 420 can be configured in such a way that a given platform 320, 330 can only nest with a given spacer 410, 420, and vice versa. This configuration is referred to as a keyed nesting configuration and can be utilized to ensure that the correct number of vanes and spacers are installed in any given installation.

As with the example of FIG. 3A, the inner diameter platforms 330 and spacers 410 each include a seal box 332 configured to carry an inner diameter seal in the same manner as described previously.

With continued reference to all of FIGS. 1-4B, the illustrated embodiments are described as being carbon fiber composite structures. It is contemplated that any similar composite material utilizing fiber pre-pregs can be utilized, and the illustrated structures are not limited specifically to carbon fiber composites.

With further reference to all of the above structures, the elimination of the non-structural filler plies allows for the carbon fiber components to be constructed lighter, and utilizing less structural material. The lighter structures, and reduced structural material can result in simplified designs and reduced costs.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a compressor section having a plurality of stages;
a combustor section fluidly connected to the compressor section via a primary flowpath;
a turbine section fluidly connected to the combustor section via the primary flowpath; and
at least one of said stages including a plurality of composite fiber vane structures, each of said composite fiber vane structures comprising a plurality of fiber plies, all of said fiber plies flowing in a single direction at each joint of the corresponding composite fiber vane structure.

2. The gas turbine engine of claim 1, wherein each of said composite fiber vane structures comprises an outer diameter platform including a fastenerless connection feature.

3. The gas turbine engine of claim 1, wherein each of said composite fiber vane structures includes a stator vane connecting an inner diameter platform to an outer diameter platform.

4. The gas turbine engine of claim 3, wherein each of said composite fiber vane structures further includes a second vane connecting the inner diameter platform to the outer diameter platform.

5. A gas turbine engine comprising:
a compressor section having a plurality of stages;
a combustor section fluidly connected to the compressor section via a primary flowpath;
a turbine section fluidly connected to the combustor section via the primary flowpath;
at least one of said stages including a plurality of composite fiber vane structures, each of said composite fiber vane structures comprising a plurality of fiber plies, all of said fiber plies flowing in a single direction at each joint of the corresponding composite fiber vane structure;
each of said composite fiber vane structures includes a stator vane connecting an inner diameter platform to an outer diameter platform and a second vane connecting the inner diameter platform to the outer diameter platform; and
wherein said at least one of said at least one stages further includes a plurality of outer spacer platforms and an outer diameter of said at least one of said at least one stages is configured as an alternating set of said outer diameter platforms and said outer spacer platforms.

6. A gas turbine engine comprising:
a compressor section having a plurality of stages;
a combustor section fluidly connected to the compressor section via a primary flowpath;
a turbine section fluidly connected to the combustor section via the primary flowpath;
at least one of said stages including a plurality of composite fiber vane structures, each of said composite fiber vane structures comprising a plurality of fiber plies, all of said fiber plies flowing in a single direction at each joint of the corresponding composite fiber vane structure;
each of said composite fiber vane structures includes a stator vane connecting an inner diameter platform to an outer diameter platform and a second vane connecting the inner diameter platform to the outer diameter platform; and
wherein said at least one of said at least one stages further includes a plurality of inner diameter spacer platforms and an inner diameter of said at least one of said at least one stages is configured as an alternating set of said inner diameter platforms and said inner diameter spacer platforms.

7. The gas turbine engine of claim 3, wherein each of said inner diameter platforms includes a seal carrying feature.

8. The gas turbine engine of claim 1, wherein the plurality of fiber plies consists of structural fiber plies.

9. The gas turbine engine of claim 1, wherein the fiber plies comprise carbon fiber plies.

10. The gas turbine engine of claim 1, wherein each of said plurality of stages is comprised of the plurality of composite fiber vane structures.

11. A composite fiber stator ring for a gas turbine engine compressor, comprising:
a plurality of composite fiber vane structures, each of said composite fiber vane structures comprising a plurality of fiber plies, all of said fiber plies flowing in a single direction at each joint of the corresponding composite fiber vane structure; and
said plurality of composite fiber vane structures arranged circumferentially in a ring.

12. The composite fiber stator ring of claim 11, wherein the plurality of fiber plies consist of structural fiber plies.

13. A composite fiber stator ring for a gas turbine engine compressor, comprising:
a plurality of composite fiber vane structures, each of said composite fiber vane structures comprising a plurality of fiber plies, all of said fiber plies flowing in a single direction at each joint of the corresponding composite fiber vane structure;
said plurality of composite fiber vane structures arranged circumferentially in a ring; and
a plurality of outer diameter spacer platforms and a plurality of inner diameter spacer platforms, wherein each of said composite fiber vane structures is circumferentially adjacent to two outer diameter spacer platforms and two inner diameter spacer platforms.

14. A composite fiber stator ring for a gas turbine engine compressor, comprising:
a plurality of composite fiber vane structures, each of said composite fiber vane structures being a composite fiber vane doublet and comprising a plurality of fiber plies, all of said fiber plies flowing in a single direction at each joint of the corresponding composite fiber vane structure;
said plurality of composite fiber vane structures arranged circumferentially in a ring.

15. A composite fiber stator ring for a gas turbine engine compressor, comprising:
a plurality of composite fiber vane structures, each of said composite fiber vane structures being a singlet and comprising a plurality of fiber plies, all of said fiber plies flowing in a single direction at each joint of the corresponding composite fiber vane structure;

said plurality of composite fiber vane structures arranged circumferentially in a ring.

16. The composite fiber stator ring of claim 11, wherein the fiber plies comprise carbon fiber plies.

17. The composite fiber stator ring of claim 11, wherein each composite fiber vane structure is retained in the composite fiber stator ring via a fastenerless connection feature.

18. The composite fiber stator ring of claim 17, wherein the fastenerless connection feature is a component of an outer diameter platform of each of said composite fiber vane structures.

19. The composite fiber vane stator ring of claim 11, wherein an inner diameter of said composite fiber vane structure is configured to carry an inner diameter seal.

20. A method for constructing a composite stator vane structure for a gas turbine engine compressor comprising;

flowing a plurality of carbon fiber plies in a single direction at each joint between at least one vane and corresponding inner and outer diameter platforms such that each fiber plie in the plurality of fiber plies is a structural fiber plie.

\* \* \* \* \*